US012686609B2

(12) United States Patent
Schulz-Hildebrandt et al.

(10) Patent No.: US 12,686,609 B2
(45) Date of Patent: Jul. 21, 2026

(54) FILLING NOZZLE

(71) Applicant: ELAFLEX HIBY GmbH & Co. KG, Hamburg (DE)

(72) Inventors: Lasse Schulz-Hildebrandt, Hamburg (DE); Matthias Fedde, Hamburg (DE)

(73) Assignee: ELAFLEX HIBY GmbH & Co. KG, Hamburg (DE)

( * ) Notice: Subject to any disclaimer, the term of this patent is extended or adjusted under 35 U.S.C. 154(b) by 14 days.

(21) Appl. No.: 18/854,099

(22) PCT Filed: Apr. 20, 2023

(86) PCT No.: PCT/EP2023/060210

§ 371 (c)(1),
(2) Date: Oct. 4, 2024

(87) PCT Pub. No.: WO2023/208700

PCT Pub. Date: Nov. 2, 2023

(65) Prior Publication Data

US 2025/0243049 A1 Jul. 31, 2025

(30) Foreign Application Priority Data

Apr. 29, 2022 (EP) .................................... 22170947

(51) Int. Cl.
*B67D 7/52* (2010.01)
*B67D 7/32* (2010.01)

(52) U.S. Cl.
CPC ............ *B67D 7/52* (2013.01); *B67D 7/3209* (2013.01); *B67D 7/3218* (2013.01)

(58) Field of Classification Search
CPC .......... B67D 7/44; B67D 7/52; B67D 7/3209; B67D 7/3218
See application file for complete search history.

(56) References Cited

U.S. PATENT DOCUMENTS 4,331,187 A * 5/1982 Trygg ...................... B67D 7/44 141/217
5,184,309 A * 2/1993 Simpson ................ B67D 7/425 141/392
5,433,247 A * 7/1995 Guertin ................... F16L 37/30 137/614.04

(Continued)

FOREIGN PATENT DOCUMENTS

EP 2386520 A1 * 11/2011 ............... B67D 7/48
EP 2428485 A1 * 3/2012 ............... B67D 7/48

*Primary Examiner* — Nicolas A Arnett
(74) *Attorney, Agent, or Firm* — Casimir Jones, S.C.; Brian F. Bradley

(57) ABSTRACT

Filling nozzle for delivering a fluid, comprising an inlet (13) for connection of a fluid feed line, an outlet (14), a main conduit (15) connecting the inlet to the outlet, a main valve device (16) for controlling a flow of fluid through the main conduit (15), a control lever (17) for actuating the main valve device (16), an automatic safety shut-off designed to move the main valve device (16) to a closed position independently of a position of the control lever (17) when a fluid pressure at the inlet (13) falls below a minimum value, and comprising a preloading device (18) which preloads the main valve device (16) into the closed position and effects a variable opening cross-section of the main valve device (16) depending on a fluid pressure at the inlet.

20 Claims, 4 Drawing Sheets

(56) References Cited

U.S. PATENT DOCUMENTS

Figure 1:
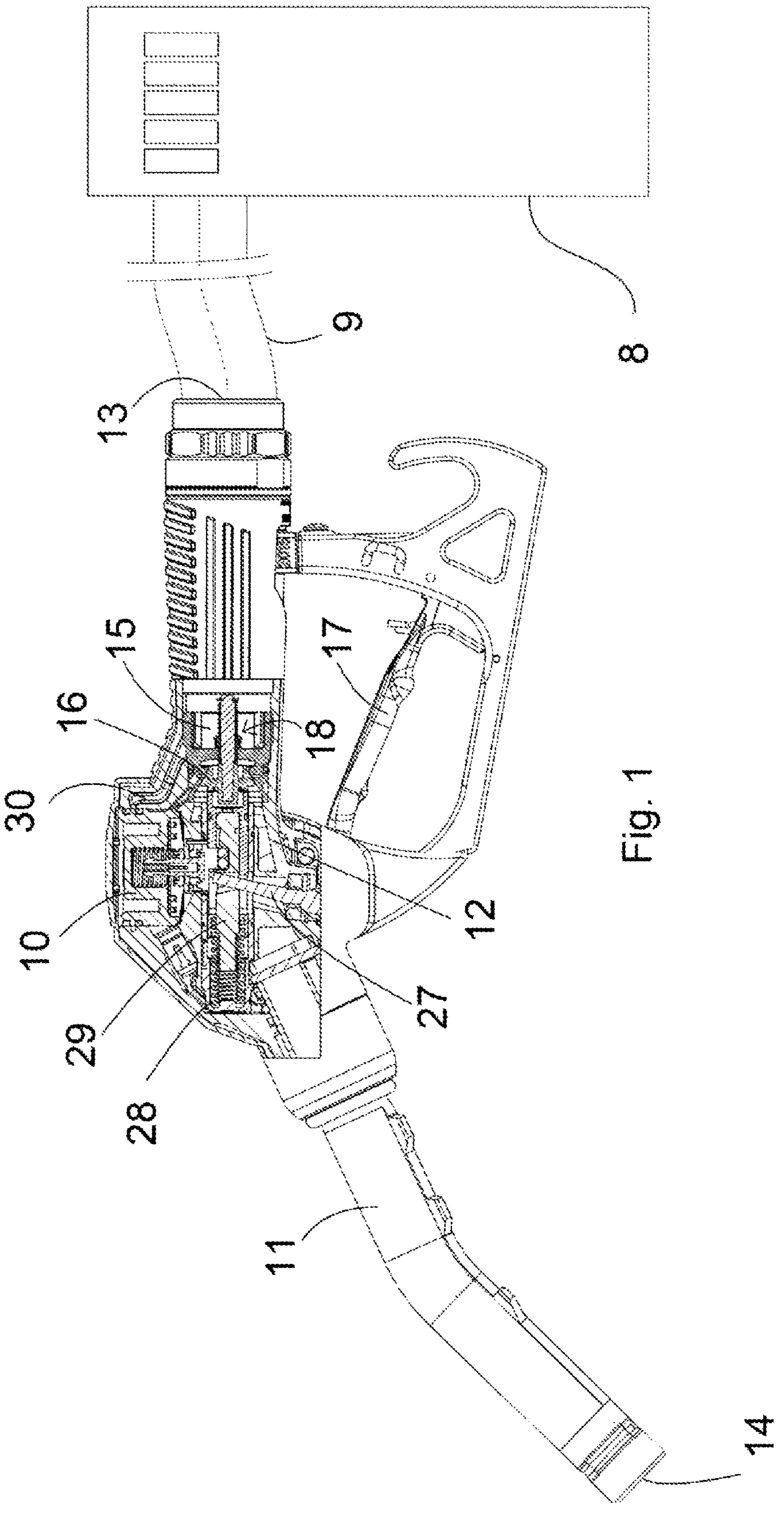

| | | | | |
|---|---|---|---|---|
| 8,695,648 | B2 * | 4/2014 | Meyer | B67D 7/52 141/206 |
| 2011/0277880 | A1 * | 11/2011 | Meyer | B67D 7/48 141/217 |
| 2012/0073700 | A1 * | 3/2012 | Meyer | B67D 7/04 251/324 |

* cited by examiner

FILLING NOZZLE

The subject of the present invention is a filling nozzle for delivering a fluid, comprising an inlet for connection of a fluid feed line, an outlet, and a main conduit connecting the inlet to the outlet. The filling nozzle also comprises a main valve device for controlling a flow of fluid through the main conduit and a control lever for actuating the main valve device. The filling nozzle also comprises an automatic safety shut-off designed to move the main valve device to a closed position independently of a position of the control lever when a fluid pressure at the inlet falls below a minimum valve. Finally, the filling nozzle comprises a preloading device which preloads the main valve device into the closed position and effects a variable opening cross section of the main valve device depending on a fluid pressure at the inlet.

Such a filling nozzle is disclosed in EP 2 386 520 B1. In particular, the filling nozzle can be used for delivering fuels into the tank of a vehicle. A user can actuate the filling nozzle by means of the control lever in order to open the main valve and to close it again after a desired quantity of fuel has been delivered. The fuel is provided via a feed pump which is generally connected to the filling nozzle by means of a fuel hose.

The feed pump generally permits a preselection of a desired quantity of fuel. In such a case, the user can wait for the delivery of the preselected quantity of fluid after they have hooked the discharge pipe of the filling nozzle into a filler neck of the vehicle and have subsequently secured the control lever by means of a latching device. After the delivery of the preselected quantity of fluid, the feed pump automatically shuts off and the delivery of fuel is terminated. It is not absolutely necessary for the control lever and therewith the main valve to be moved back again into the closed position after the feed pump shuts off. If the main valve remains in the open position, in principle this is associated with the risk of fuel escaping in an uncontrolled manner in a subsequent refueling process. In order to avoid this risk, the known filling nozzle has the above-described automatic safety shut-off which moves the main valve into the closed position when the pressure at the inlet falls below a minimum value, in particular after the feed pump shuts off.

In the previously known filling nozzle, during the delivery of the fluid, the above-mentioned preloading device generates upstream of the main valve an increased dynamic pressure which ceases after the feed pump shuts off. The preloading device thus contributes to the generation of a sufficient pressure difference which can be used inside the automatic shut-off device in the known manner in order to ensure a safe shut-off. Moreover, the preloading device ensures that fuel which is still present inside the fuel hose also cannot escape in an uncontrolled manner when the fuel hose is full of fluid after the feed pump shuts off and the automatic shut-off device has not (yet) been triggered.

In this context, however, a problem can arise when the pressure at the inlet and inside the fuel hose in full hose mode (i.e. when the feed pump is shut off and the fuel hose is full of fluid) does not fall below the minimum pressure or even increases further when, for example, fuel pumped from a cold underground tank is heated in a fuel hose exposed to the sun. In order to solve this problem it has been proposed in EP 2 386 520 B1 that the main valve is urged in a tilted manner into the closed position by the action of the preloading device such that the tightness thereof is reduced. Due to the reduced tightness, the pressure which is present in full hose mode can be reduced in a controlled manner so that a safe shut-off is ensured by this previously known solution. However, it has been shown that the components which contribute to the tilting of the main valve require small manufacturing tolerances and significant effort in terms of testing.

Proceeding from this prior art, it is the object of the present invention to provide a filling nozzle which at least partially avoids the aforementioned drawbacks. This object is achieved by the features of the independent claims. Advantageous embodiments are specified in the dependent claims. According to the invention the preloading device is designed to produce a discontinuous opening characteristic of the main valve device in such a way that a closing force acting on the main valve device is reduced in a first opening cross-sectional range extending from the closed position of the main valve device to a limit opening cross section.

Firstly, some terms used in the context of the invention are explained. The term "fluid" encompasses substances which are liquid, gaseous or in a mixed phase.

The main valve device can have exactly one or even two or more valve bodies. An opening cross section of the main valve device is a cross-sectional area which is dependent on the opening state of the one valve body or the plurality of valve bodies of the main valve device, and which is available for the flow of fluid through the main valve device. In the closed position of the main valve device, all of the valve bodies of the main valve device are in a closed position. If the main valve device is closed, therefore, it has an opening cross section of zero.

Due to the discontinuous opening characteristic according to the invention, a closing force which acts on a valve body is reduced starting from the closed position to the limit opening cross section (i.e. within the first opening cross-sectional range). The minimum pressure prevailing at the inlet required for opening the main valve device is reduced thereby. As a result, the main valve device can be more easily opened, by the valve body, whose closing force is reduced, performing a corresponding opening movement. Thus it can be ensured that in full hose mode a small pressure prevailing upstream of the main valve device is already sufficient in order to open the main valve device. In this manner the pressure can be reliably reduced below the minimum pressure at which the automatic shut-off device is triggered.

On the other hand, the fluid provided by a feed pump during normal pumping mode acts with a significantly greater pressure on the main valve device so that the limit opening cross section is regularly exceeded. The discontinuity of the opening characteristic is characterized in that the reduction of the closing force ceases when the limit opening cross section is exceeded. When the limit opening cross section is exceeded, therefore, a greater pressure difference is required for a further increase in the opening cross section. Thus when the limit opening cross section is exceeded, a high pressure is created upstream of the main valve device, this high pressure being able to be used in the known manner to act on the automatic shut-off device. The operational reliability of the automatic shut-off device can be improved in this manner.

In a preferred embodiment, the preloading device is designed such that a minimum pressure which is required for opening the main valve device ranges between 0.01 bar and 0.5 bar, preferably between 0.05 bar and 0.3 bar. It can also be provided that a pressure threshold value from which the opening cross section exceeds the limit opening cross section ranges between 0.075 bar and 0.5 bar. Preferably, the pressure threshold value is at least 5% greater, further preferably at least 20%, particularly preferably at least 50% greater than the minimum pressure. If in this embodiment the pressure prevailing at the inlet is between the minimum pressure and the pressure threshold value, the main valve device opens in a controlled manner (to a maximum up to the limit opening cross section) and permits a controlled pressure reduction below the minimum pressure, below which the automatic shut-off device is triggered. The minimum pressure can be, for example, between 0.075 bar and 0.45 bar. The automatic safety shut-off and the preloading device are preferably designed such that the lowest pressure is between the minimum pressure and the pressure threshold value. The limit opening cross section can range, for example, between 1 $mm^2$ and 12 $mm^2$, preferably between 2 $mm^2$ and 8 $mm^2$.

In one embodiment, the main valve device has a main valve body, a main valve seat, a pressure reduction conduit and a pressure reduction valve body which is configured for closing the pressure reduction conduit. Thus in this embodiment the main valve device has two valve bodies. The preloading device can be designed to urge the main valve body and the pressure reduction valve body independently of one another into the closed position, wherein a change in the opening cross section of the main valve device in the first opening cross-sectional range is effected by a movement of the pressure reduction valve body and wherein a change in the opening cross section of the main valve device beyond the limit opening cross section is effected by a movement of the main valve body relative to the main valve seat. In this embodiment, an opening cross section of the main valve device can thus be altered by an open state of the pressure reduction valve body being changed and/or the main valve body being moved relative to the main valve seat.

Preferably, the pressure reduction conduit runs through the main valve body. The preloading device can also have a first restoring element, which is preferably configured as a full hose spring, for urging the main valve body into the closed position. The preloading device can also have a second restoring element, which is preferably configured as a pressure reduction spring, for urging the pressure reduction valve body into the closed position.

Since the main valve device has two valve bodies which are independent of one another and the preloading device for each of these valve bodies has a separate restoring element, the described discontinuity of the opening characteristic can be implemented in a simple manner. In particular, it can be provided that the main valve device in full hose mode is opened by fluid pressure, by the pressure reduction valve body being opened only while the main valve body remains in a closed position in which it sealingly bears against the main valve seat. When the pressure reduction valve body is fully open, it is preferably possible to achieve an opening cross section which corresponds to the limit opening cross section. An excess pressure, which is present in full hose mode upstream of the main valve device, can thus be reduced in a controlled manner via the pressure reduction conduit. In normal pumping mode (i.e. when the feed pump is switched on) the opening cross section of the main valve device is (additionally) increased by a movement of the main valve body relative to the main valve seat so that an increased dynamic pressure, which is predetermined by the first restoring element or the full hose spring, is present upstream of the main valve device.

In an alternative embodiment, the main valve device comprises a main valve body which is preloaded by the preloading device against a main valve seat into a closed position, wherein the first opening cross-sectional range corresponds to a first adjustment range of the main valve body and a second opening cross-sectional range beyond the limit opening cross section corresponds to a second adjustment range of the main valve body subsequent to the first adjustment range. An adjustment range of the main valve body denotes a movement range which extends in an axial direction of the main valve body (deflection range) and within which the main valve body can be moved relative to the valve seat in order to open or close the main valve device. Preferably, the discontinuous opening characteristic is also implemented by the preloading device having a smaller restoring constant in the first adjustment range than in the second adjustment range. The “restoring constant” is a measurement of the ratio between the force required for a movement of the main valve body and the deflection of the main valve body achieved thereby. Due to the smaller restoring constant of the preloading device in the first adjustment range, the main valve body in this adjustment range is urged less powerfully into the closed position. This enables a smaller fluid pressure upstream of the main valve device to bring about an opening of the main valve device, until the end of the first adjustment range and thus the limit opening cross section is reached. If the main valve device is subjected to a greater fluid pressure in normal pumping mode, a further movement of the main valve body takes place within the second adjustment range counter to a restoring force predetermined by the greater restoring constant.

For example, the preloading device can comprise a first restoring element and a second restoring element, wherein a movement of the main valve body in the first adjustment range in an opening direction takes place primarily or exclusively counter to a restoring force of the second restoring element, and wherein a movement of the main valve body in the second adjustment range in the opening direction takes place primarily or exclusively counter to a restoring force of the first restoring element.

The above-mentioned separate action of the restoring elements in the different adjustment ranges can be achieved, for example, by the first restoring element preloading the main valve body relative to a displaceable holding element, wherein the second restoring element preloads the displaceable holding element relative to the main valve seat of the main valve device. A movement of the main valve body in the first adjustment range in the opening direction can take place in this case by a common movement of the holding element and the main valve body counter to a restoring force of the second restoring element, wherein a movement of the main valve body in the second adjustment range in the opening direction can take place by a movement of the main valve body relative to the holding element counter to a restoring force of the first restoring element.

In the above-described embodiment, a displaceability of the displaceable holding element relative to the main valve seat can be delimited by a first stop positioned on the main valve seat. Moreover, the mobility of the displaceable holding element relative to the main valve body can be delimited by a second stop formed on the main valve body. If there is only a low pressure upstream of the main valve device, the main valve body is biased by the first restoring element counter to the displaceable holding element until the holding element strikes against the second stop of the main valve body. At the same time, due to the restoring force of the second restoring element, the holding element is spaced apart from the stop which is present on the main valve seat. If starting from the closed position the main valve body is moved within the first adjustment range, this is associated in this case with a displacement of the holding element relative to the main valve seat and a corresponding deflection of the second restoring element. If the fluid pressure upstream of the main valve device increases, the holding element is deflected counter to the restoring force of the second restoring element and comes to rest against the first stop. A subsequent further pressure increase then leads to an opening movement of the main valve body (within the second adjustment range) relative to the holding element, with at the same time a deflection of the first restoring element.

In a further alternative embodiment, the preloading device comprises a first restoring element with a first restoring constant which urges the main valve body into the closed position relative to the main valve seat. Moreover, in this embodiment, the preloading device comprises a second restoring element with a second restoring constant which urges the main valve body in the opening direction relative to the main valve seat. In this case, the second restoring element counteracts the first restoring element, whereby a reduction in the closing force can be achieved in the first adjustment range, which permits a controlled pressure reduction. When the limit opening cross section is exceeded (i.e. in the second adjustment range), the opposing action of the second restoring element can be eliminated, whereby the discontinuity of the opening characteristic according to the invention can be implemented. In particular, the restoring constant of the preloading device in the first adjustment range can result from a combination of the restoring constants of the first and second restoring elements, wherein the restoring constant of the preloading device when the limit opening cross section is exceeded (i.e. within the second adjustment range) can result primarily or exclusively from the restoring constant of the first restoring element.

It can also be provided that a restoring force of the first restoring element which acts in the first adjustment range on the main valve body is greater than a restoring force of the second restoring element which acts in the first adjustment range on the main valve body. As a result, it is ensured that in the absence of a fluid pressure the main valve body is moved fully into the closed position.

Preferably, the second restoring element has a first end and an opposing second end in a deflection direction, wherein the first end is fixed to the main valve body and wherein during a movement of the main valve body in the first adjustment range the second end bears against a stop which is fixed relative to the main valve seat, and wherein during a movement of the main valve body in the second adjustment range the second end is released from the stop. Preferably, a deflection of the second end of the second restoring element in the upstream direction is also delimited by a limit projection which is fixed to the main valve body. It can be achieved by this exemplary embodiment that only the first restoring element acts on the main valve body in the second adjustment range.

A further subject of the invention is a filling pump with a feed pump for delivering a fluid and with a filling hose which connects the feed pump to a filling nozzle according to the invention.

Advantageous embodiments of the invention are explained by way of example hereinafter with reference to the accompanying drawings.

Figures 2, 2A, 2B, 3, 3A, 3B:
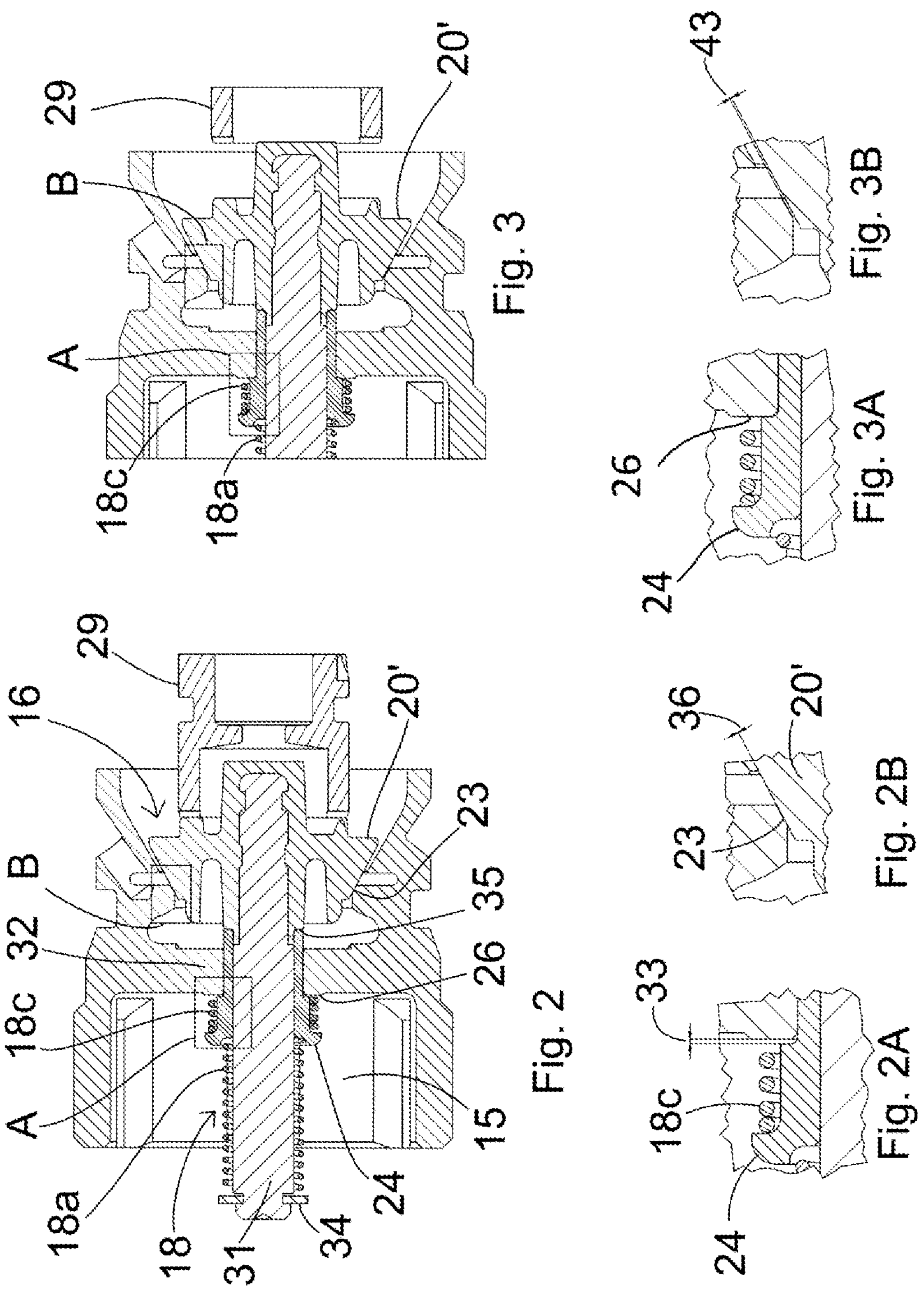
Figure 4:
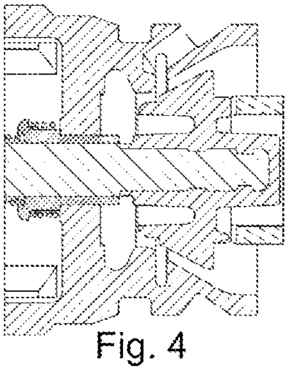
Figure 5:
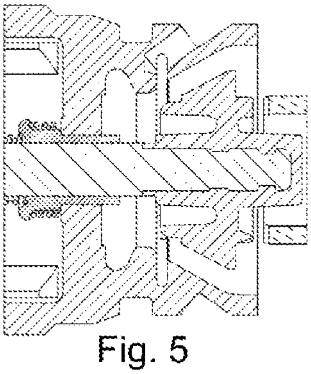
Figure 6:
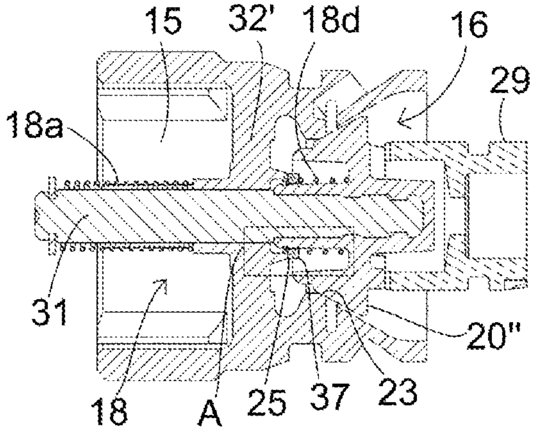
Figure 7:
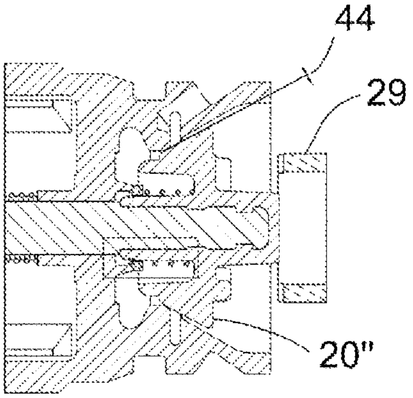
Figure 6A:
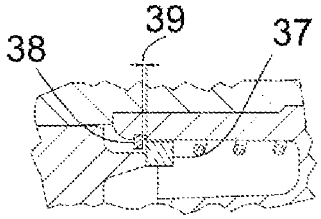
Figure 7A:
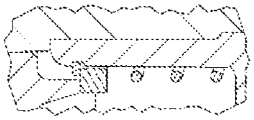
Figure 8:
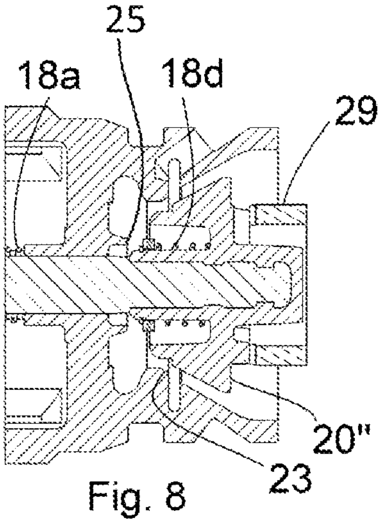
Figure 9:
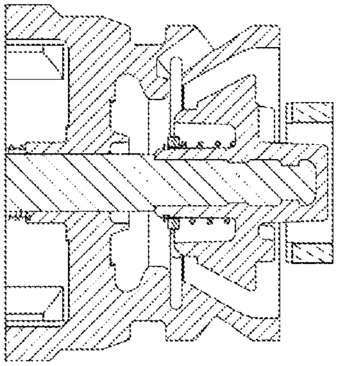
Figure 10:
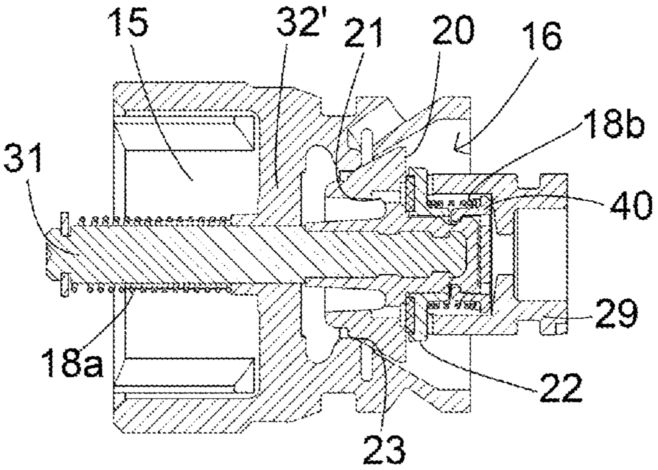
Figure 11:
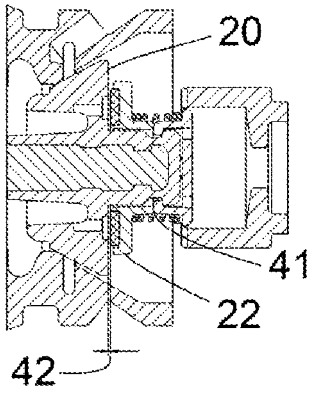
Figure 12:
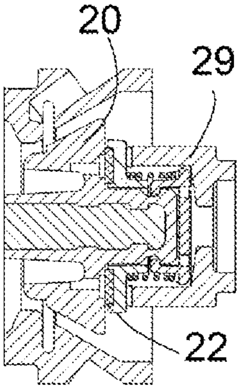
Figure 13:
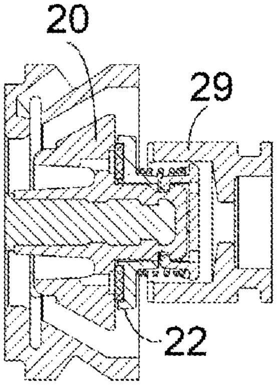

In the drawings:

FIG. 1: shows a filling pump according to the invention to which a filling nozzle according to the invention is connected, in a partially sectional side view;

FIG. 2: shows a partial detail of the embodiment of FIG. 1, in a lateral sectional view;

FIG. 2A: show a detail of FIG. 2, in an enlarged view;

FIG. 2B: show a detail of FIG. 2, in an enlarged view;

FIG. 3: shows a partial detail of FIG. 2, wherein the filling nozzle is in a different operating state;

FIG. 3A: shows a detail of FIG. 3, in an enlarged view;

FIG. 3B: shows a detail of FIG. 3, in an enlarged view;

FIG. 4: shows the view of FIG. 3, wherein the filling nozzle is in a different operating state;

FIG. 5: shows the view of FIG. 3 also in a different operating state;

FIG. 6: shows a part of a second embodiment of a filling nozzle according to the invention, in a sectional side view;

FIG. 6A: shows a detail of FIG. 6, in an enlarged view;

FIG. 7: shows a partial detail of FIG. 6 in a lateral sectional view in a different operating state;

FIG. 7A: shows a detail of FIG. 7, in an enlarged view;

FIG. 8: shows the view of FIG. 7, wherein the filling nozzle is in a different operating state;

FIG. 9: shows the view of FIG. 7, wherein the filling nozzle is also in a different operating state;

FIG. 10: shows a part of a third embodiment of a filling nozzle according to the invention, in a sectional side view;

FIGS. 11-13: show partial details of FIG. 10, wherein the filling nozzle is in each case in different operating states.

FIG. 1 shows a filling pump 8 according to the invention to which a filling nozzle according to the invention is connected for delivering a fuel, in a partially sectional side view. The filling nozzle comprises a housing 12 with an inlet 13 which is connected to a fuel hose 9. The fuel hose 9 leads to the filling pump 8, shown schematically. A feed pump (not shown) which is configured to pressurize the fuel and to transport it to the filling nozzle is located inside the filling pump 8. A discharge pipe 11 is inserted into the housing 12, an outlet 14 being located at the front end thereof. A main conduit 15 which can be closed by a main valve device 16 extends through the filling nozzle from the inlet 13 to the outlet 14.

The main valve device 16 has a main valve body which, in the state of FIG. 1, is held in the known manner in a closed position by a closing spring 28 and a piston arrangement 29 acted upon by the closing spring. The main valve device 16 can be actuated in the known manner via a control lever 17, by the piston arrangement 29 being displaced to the left by means of a control lever pin 27 counter to the force of the closing spring 28. As a result, the main valve body is released in a manner known in principle, so that a fluid pressure prevailing upstream of the main valve device can move the main valve body into an open position.

Additionally and independently of the closing spring 28 and the piston arrangement 29, the main valve device is urged by a preloading device 18 into the closed position. After the actuation of the control lever 17 for delivering the fuel, the fluid pressure at the inlet 13 has to be sufficiently great in order to overcome the resistance of the preloading device 18. The cooperation of the preloading device 18 with the main valve device 16 is described hereinafter in detail, in connection with FIGS. 2 to 5.

The filling nozzle also has an automatic shut-off device 10 which is configured to move the main valve device 16, independently of a position of the control lever 17, into the closed position when a fluid pressure at the inlet 13 falls below a minimum value. In particular, the shut-off device 10 is designed in a manner known in principle (see for example EP 2 386 520 B1) to uncouple the control lever pin 27 from the piston arrangement 29 so that the main valve body is moved, independently of the position of the control lever, by the closing spring 28 into the closed position and held there. A pressure connection conduit 30 leads into the main conduit 15 upstream of the main valve device 16. The pressure connection conduit 30 cooperates in the known manner with the automatic shut-off device 10 such that a pressure dropping below the minimum value upstream of the main valve device 16 leads to a triggering of the shut-off device 10 and thus to the above-described uncoupling of the control lever 17 from the piston arrangement 29.

FIG. 2 shows a partial detail of the embodiment of FIG. 1 in a lateral sectional view. The partial detail shows the region of the filling nozzle according to the invention in which the main valve device 16 and the preloading device 18 are arranged and cooperate with one another. The regions A and B which are shown enlarged in FIGS. 2A and 2B are also marked in FIG. 2.

The main valve device 16 of this embodiment has a main valve body 20' and a main valve seat 23. In the operating state shown in FIG. 2, the piston arrangement 29 urges the main valve body 20' into a closed position against the main valve seat 23.

Irrespective thereof, the main valve body 20' which is connected to a valve rod 31 is also preloaded by the preloading device 18 into the closed position against the main valve seat 23. The valve rod 31 runs in an axial direction of the main valve body 20'. The preloading device 18 comprises a full hose spring 18*a*, a pressure reduction spring 18*c* and a displaceable holding element 24. The two springs 18*a*, 18*c* are compressed relative to their resting position (and thus force apart the elements against which they bear), wherein the pressure reduction spring 18*c* exerts a smaller closing force on the main valve body 20' and has a smaller spring constant than the full hose spring 18*a*. A smaller force is required for effecting a predetermined deflection of the pressure reduction spring 18*c* than in the case of the full hose spring 18*a*.

The main valve seat 23 is connected in one piece to holding projections 32 which slidably bear the displaceable holding element 24 and permit a displacement of the holding element 24 in the axial direction. The valve shaft 31 is also slidably guided through a through-opening present in the displaceable holding element 24.

The mobility of the valve shaft 31, or the valve body 20' connected thereto, relative to the holding element 24 in the closing direction is defined by a stop 35 which is formed on the rear end of the main valve body 20'.

The pressure reduction spring 18*c* preloads the holding element 24 relative to the holding projections 32 (and thus relative to the valve seat 23) in the closing direction (i.e. to the left in FIG. 2). At the same time, the full hose spring 18*a* acts on an outwardly facing projection 34 of the valve shaft 31 and on the upstream end of the holding element 24 and biases the valve body 20' relative to the holding element 24 upstream in the closing direction but only sufficiently far until the front end of the holding element 24 comes to rest against the stop 35. The stop 35 is positioned such that the main valve body 20' cannot be moved fully into the closed position solely by the full hose spring 18*a*, but only by the additional action of the pressure reduction spring 18*c* (or by the additional action of the piston device 29 and the closing spring 28). When the piston device 29 releases the main valve body, the main valve body 20' is only moved fully into the closed position by the pressure reduction spring 18*c*. To this end, the pressure reduction spring 18*c* urges the holding element 24 away from the holding projections 32, so that a gap 33 is formed between the holding element 24 and a stop 26 of the holding projections 32 (see FIG. 2A). In this state, the main valve body 20' bears fully against the valve seat 23, resulting in an opening cross section of zero. This is indicated in FIG. 2B by the reference sign 36.

FIG. 3 shows a detail of FIG. 2 in a different operating state in which the piston arrangement 29 is spaced apart from the downstream end of the main valve body 20' and the main valve body is thus released. Moreover, the fuel hose is full of fluid, so that a corresponding fluid pressure prevails upstream of the main valve device. This state can be present, for example, when the control lever is blocked in an open position and the feed pump has been switched off after the delivery of a preselected quantity of fuel. By switching off the feed pump the fluid pressure drops significantly upstream of the main valve device 16, wherein in the present case (due to the fuel hose still being full of fluid) the fluid pressure still remains above the minimum pressure at which the automatic shut-off device is triggered. The main valve body 20' is thus biased into the closed position by the full hose spring 18*a* and the pressure reduction spring 18*c* (to the left in FIG. 3).

In the state shown in FIG. 3, initially a fluid pressure remains upstream of the main valve device 16 which is sufficient in order to move the main valve body 20' together with the holding element 24 counter to the restoring force of the pressure reduction spring 18*c* into an open position, until the holding element 24 strikes against the stop 26 (see FIG. 3A). The gap 33 shown in FIG. 2B is closed thereby (see FIG. 3A). In this manner, an opening cross section of the main valve device 16 which corresponds to the limit opening cross section is present. This can be identified in FIGS. 3A and 3B, in which the details identified in FIG. 3 by the letters A or B are shown enlarged. In particular, it can be identified in FIG. 3B that the main valve body 20' is slightly lifted away from the main valve seat 23 (see gap 43). A fluid pressure prevailing upstream of the main valve device 16 thus can be reduced in a controlled manner until the fluid pressure drops below the minimum pressure at which the shut-off device is triggered. If the holding element 24 bears against the stop 26, with a further opening movement of the main valve body 20' the pressure reduction spring 18*c* cannot be further compressed. Such a further opening movement (by which an opening cross section which exceeds the limit opening cross section is generated) thus has to take place counter to the restoring force of the full hose spring 18*a*. The opening characteristic of the preloading device 18 is thus discontinuous when the limit opening cross section is exceeded. While a reduced restoring force generated by the pressure reduction spring 18*c* has to be overcome in the first opening cross-sectional range, the further opening movement beyond the limit opening cross section takes place counter to the greater restoring force of the full hose spring 18*a*. This is explained hereinafter in connection with FIG. 4.

FIG. 4 shows the detail of FIG. 3 in a different operating state of the filling nozzle. In the state of FIG. 4, the control lever 17 is in a central open position which is associated with a predetermined axial position of the piston arrangement 29. Moreover, in the state shown in FIG. 4, the feed pump is switched on so that the fluid pressure prevailing upstream of the main valve device 16 is sufficient in order to move the main valve body 20' counter to the restoring force of the full hose spring 18*a* downstream in the axial direction until the main valve body 20' strikes against the piston arrangement 29. An opening cross section of the main valve device which goes beyond the limit opening cross section is present.

FIG. 5 shows the detail of FIGS. 3 and 4 in a different operating state of the filling nozzle. The control lever 17 is in a fully open position. The piston arrangement 29 is accordingly displaced further to the right relative to the position of FIG. 4. The fluid pressure generated by the feed pump can move the main valve body 20' further to the right relative to the state shown in FIG. 4 so that the opening cross section is further increased.

FIG. 6 shows a main valve device 16 and a preloading device 18 of a second embodiment of a filling nozzle according to the invention. Those elements which are present substantially identically in the first embodiment according to the invention are provided in the present case with the same reference signs. The differences between the first embodiment and the second embodiment are explained hereinafter.

In the embodiment of FIG. 6 the main valve device 16 comprises a main valve body 20" which is urged by a preloading device 18 into the closed position, wherein the preloading device 18 has a full hose spring 18*a* and a pressure reduction spring 18*d*. Holding projections 32' which are connected in one piece to the valve seat 23 are also present, the main valve piston 31 being slidably and displaceably mounted thereon in its axial direction. The full hose spring 18*a* acts on an upstream end of the holding projections 32' in order to bias the main valve in the closing direction. The pressure reduction spring 18*d* is connected with its downstream end to the main valve body 20" and has on its opposing upstream end a sliding ring 37 which can be displaced by the deflection of the pressure reduction spring 18*d* relative to the main valve body 20" as far as a limit projection 38. In the state shown in FIG. 6, the sliding ring 37 bears against a downstream stop 25 of the holding projections 32' so that the main valve body 20" is biased by the pressure reduction spring 18*d* relative to the valve seat 23 in an opening direction. In the state shown in FIG. 6, however, the control lever 17 is in the closed position so that the main valve cone 20" is also biased into the closed position by the piston arrangement 29 acted upon by the closing spring 28. In the position shown, a gap 39 is present between the sliding ring 37 and the limit projection (see FIG. 6A in which the detail A of FIG. 6 is shown enlarged).

FIG. 7 shows a detail of FIG. 6 in a state in which the piston arrangement 29 is spaced apart from the downstream end of the main valve body 20" and the main valve body is correspondingly released. As already explained above, this state can be present, for example, when the control lever is blocked in an open position, the feed pump is switched off after a preselected quantity of fuel has been delivered and the automatic shut-off device has not yet been triggered. The main valve body 20" in this case, as explained above, is biased by the full hose spring 18*a* in the closing direction and by the pressure reduction spring 18*d* in the opening direction. The closing force exerted by the full hose spring 18*a* on the main valve body 20" is correspondingly reduced by the pressure reduction spring 18*d* and a minimum pressure required for opening is also reduced. By the action of a small fluid pressure the main valve body 20" can thus be moved in the opening direction until the sliding ring 37 comes to rest on the limit projection 38 (see FIG. 7A). This opening movement corresponds to a first adjustment range of the main valve body 20" and the opening cross section which can be achieved thereby corresponds to the limit opening cross section. By the slight opening of the main valve device (illustrated in FIG. 7 by the gap 44) the fluid pressure can be reduced in a controlled manner until the minimum pressure is fallen below and the automatic shut-off device is triggered.

If the main valve device, however, is actuated by means of the control lever 17 a further opening movement of the main valve body 20" takes place (beyond the limit opening cross section) counter to the full restoring force of the full hose spring 18*a* and thus requires a significantly greater pressure difference since the pressure reduction spring 18*d* no longer counteracts the restoring force of the full hose spring 18*a* in the subsequent second adjustment range. In this manner, when the limit opening cross section is exceeded, a discontinuity of the opening characteristic of the main valve device is generated.

FIG. 8 shows the detail of FIG. 7 in a further operating state of the filling nozzle. In the state of FIG. 8 the control lever 17 is in a central open position which is associated with a predetermined axial position of the piston arrangement 29. Moreover, in the state shown in FIG. 8, the feed pump is switched on so that the fluid pressure prevailing upstream of the main valve device 16 is sufficient in order to move the main valve body 20" counter to the restoring force of the full hose spring 18*a* downstream in the axial direction, until the main valve body 20' strikes against the piston arrangement 29. An opening cross section of the main valve device which goes beyond the limit opening cross section is present. The pressure reduction spring 18*d* in this state is no longer in contact with the stop 25.

FIG. 9 shows the detail of FIGS. 7 and 8 in a further operating state of the filling nozzle. In the state of FIG. 9 the control lever 17 is in a fully open position. The piston arrangement 29 is accordingly displaced further to the right relative to the position of FIG. 8. The fluid pressure generated by the feed pump can thus move the main valve body 20" further to the right relative to the state shown in FIG. 8, so that the opening cross section is further increased.

FIG. 10 shows a main valve device 16 and a preloading device 18 of a third embodiment of a filling nozzle according to the invention. Those elements which are present substantially identically in the first or second embodiment according to the invention are provided in the present case with the same reference signs. The differences from the other embodiments are explained hereinafter.

In the embodiment of FIG. 10, the main valve device 16 comprises a main valve body 20 which is biased by the preloading device 18 in the closing direction against a main valve seat 23. The main valve device 16 also comprises a pressure reduction conduit 21 extending through the main valve body 20 and a pressure reduction valve body 22 which is configured for closing the pressure reduction conduit 21. The main valve device 16 thus comprises in the present case two valve bodies 20, 22, each thereof being able to contribute to opening the main valve device 16. As in the embodiment of FIGS. 6 to 9, the filling nozzle has holding projections 32' which are connected in one piece to the valve seat 23, the main valve piston 31 being slidably and displaceably mounted thereon in its axial direction. The preloading device 18 comprises a full hose spring 18*a* which biases the main valve body 20 against the valve seat 23 and a pressure reduction spring 18*b* which biases the pressure reduction valve body 22 against the main valve body 20. To this end, the pressure reduction spring 18*b* is clamped in a compressed state between a downstream end of the pressure reduction valve 22 and an outwardly protruding collar 40 which is fixed to the main valve body 20.

In the operating state shown in FIG. 10, the piston arrangement 29 urges both the main valve body 20 against the main valve seat 23 and the pressure reduction valve 22 against the main valve body 20 into a closed position.

FIG. 11 shows a detail of FIG. 10, wherein the piston arrangement 29 is spaced apart from the downstream end of the main valve body 20 and the pressure reduction valve body 22. The feed pump has also been switched off after delivering a preselected quantity of fuel and the automatic shut-off device has not yet been triggered. The main valve body 20 in this case is biased in the closing direction by the full hose spring 18*a*. Moreover, the pressure reduction valve 22 is biased in the closing direction by the pressure reduction spring 18*b*. The restoring constants of the elements 18*a* and 18*b* are selected in the present case such that a movement of the pressure reduction valve body 22 relative to the main valve body 20 in the opening direction requires a smaller minimum pressure at the inlet 13 than a movement of the main valve body 20 relative to the main valve seat 23 in the opening direction. The currently prevailing low pressure is thus sufficient in order to move the pressure reduction valve 22 in the opening direction until it strikes against a stop 41 which is fixed relative to the main valve body. A gap 42 through which the fluid can flow is produced between the main valve body 20 and a sealing surface of the pressure reduction valve body 22. Due to this opening movement an opening cross section of the main valve device 16 is increased up to a limit opening cross section. The fluid pressure can be reduced in a controlled manner by slightly opening the main valve device, until the minimum pressure is fallen below and the automatic shut-off device is triggered. A further opening movement of the main valve device 16 (beyond the limit opening cross section) which is achieved by a movement of the main valve body 20 relative to the main valve seat 23 in the opening direction, requires a significantly higher pressure which is present only when the feed pump is switched on. Since the opening of the main valve device 16 takes place before reaching the limit opening cross section counter to the smaller closing force of the pressure reduction spring and after exceeding the limit opening cross section counter to the greater closing force of the full hose spring 18*a*, a discontinuous opening characteristic of the main valve device 16 is implemented in the region of the limit opening cross section.

FIG. 12 shows the detail of FIG. 11 in a further operating state of the filling nozzle. In the state of FIG. 12, the control lever 17 is in a central open position which is associated with a predetermined axial position of the piston arrangement 29. Moreover, in the state shown in FIG. 12, the feed pump is switched on so that the fluid pressure prevailing upstream of the main valve device 16 is sufficient in order to move the main valve body 20, in addition to the pressure reduction valve 22, counter to the restoring force of the full hose spring 18*a* in the opening direction until the main valve body 20 strikes against the piston arrangement 29. An opening cross section of the main valve device 16 which goes beyond the limit opening cross section is present here.

FIG. 13 shows the detail of FIGS. 11 and 12 in a different operating state of the filling nozzle. In the state of FIG. 13 the control lever 17 is in a fully open position. The piston arrangement 29 is accordingly displaced further to the right relative to the position of FIG. 12. The fluid pressure generated by the feed pump can thus move the main valve body 20 further to the right relative to the state shown in FIG. 12, so that the opening cross section is further increased.

The invention claimed is:

1. A filling nozzle for delivering a fluid, comprising an inlet (13) for connection of a fluid feed line, an outlet (14), a main conduit (15) connecting the inlet (13) to the outlet (14), a main valve device (16) for controlling a flow of fluid through the main conduit (15), a control lever (17) for actuating the main valve device (16), an automatic safety shut-off designed to move the main valve device (16) to a closed position independently of a position of the control lever (17) when a fluid pressure at the inlet (13) falls below a minimum value, and comprising a preloading device (18) which preloads the main valve device (16) into the closed position and effects a variable opening cross section of the main valve device (16) depending on a fluid pressure at the inlet (13), characterized in that the preloading device (18) is designed to produce a discontinuous opening characteristic of the main valve device (16) in such a way that a closing force acting on the main valve device (16) is reduced in a first opening cross-sectional range extending from the closed position of the main valve device (16) to a limit opening cross section.

2. The filling nozzle as claimed in claim 1, wherein the preloading device (18) cooperates with the main valve device (16) such that the limit opening cross section ranges between 1 $mm^2$ and 12 $mm^2$ and/or a minimum pressure which is required for opening the main valve device ranges between 0.01 bar and 0.5 bar.

3. The filling nozzle as claimed in claim 2, wherein the minimum pressure which is required for opening the main valve device ranges between 0.05 bar and 0.3 bar.

4. The filling nozzle as claimed in claim 1, wherein the preloading device (18) cooperates with the main valve device (16) such that a pressure threshold value from which the opening cross section exceeds the limit opening cross section ranges between 0.075 bar and 0.5 bar.

5. The filling nozzle as claimed in claim 4, wherein the pressure threshold value is at least 5% greater than a minimum pressure which is required for opening the main valve device.

6. The filling nozzle as claimed in claim 4, wherein the pressure threshold value is at least 50% greater than a minimum pressure which is required for opening the main valve device.

7. The filling nozzle as claimed in claim 1, wherein the main valve device (16) has a main valve body (20), a main valve seat (23), a pressure reduction conduit (21) and a pressure reduction valve body (22) which is configured for closing the pressure reduction conduit (21), wherein the preloading device (18) is designed to urge the main valve body (20) and the pressure reduction valve body (22) independently of one another into a closed position, wherein a change in the opening cross section of the main valve device (16) in the first opening cross-sectional range is effected by a movement of the pressure reduction valve body (22), wherein a change in the opening cross section of the main valve device (16) beyond the limit opening cross section is effected by a movement of the main valve body (20) relative to the main valve seat (23).

8. The filling nozzle as claimed in claim 7, wherein the pressure reduction conduit runs through the main valve body (20).

9. The filling nozzle as claimed in claim 7, wherein the preloading device (18) has a first restoring element (18*a*) for urging the main valve body (20) into the closed position and a second restoring element (18*b*) for urging the pressure reduction valve body (22) into the closed position.

10. The filling nozzle as claimed in claim 1, wherein the main valve device (16) comprises a main valve body (20', 20") which is preloaded by the preloading device (18) against a main valve seat (23) into a closed position, wherein the first opening cross-sectional range corresponds to a first adjustment range of the main valve body (20', 20") and a second opening cross-sectional range beyond the limit opening cross section corresponds to a second adjustment range of the main valve body (20', 20") subsequent to the first adjustment range, wherein the discontinuous opening characteristic is implemented by the preloading device (18) having a smaller restoring constant in the first adjustment range than in the second adjustment range.

11. The filling nozzle as claimed in claim 10, wherein the preloading device (18) comprises a first restoring element (18*a*) and a second restoring element (18*c*), wherein a movement of the main valve body (20') in the first adjustment range in the opening direction takes place primarily counter to a restoring force of the second restoring element (18*c*), and wherein a movement of the main valve body (20') in the second adjustment range in the opening direction takes place primarily; counter to a restoring force of the first restoring element (18*a*).

12. The filling nozzle as claimed in claim 11, wherein the first restoring element (18*a*) preloads the main valve body (20') relative to a displaceable holding element (24), wherein the second restoring element (18*c*) preloads the displaceable holding element (24) relative to the main valve seat (23) of the main valve device (16).

13. The filling nozzle as claimed in claim 12, wherein a displaceability of the displaceable holding element (24) relative to the main valve seat (23) is delimited by a first stop (26).

14. The filling nozzle as claimed in claim 13, wherein a displaceability of the displaceable holding element (24) relative to the main valve body (20') is delimited by the second stop (35).

15. The filling nozzle as claimed in claim 11, wherein the preloading device (18) comprises a first restoring element (18*a*) and a second restoring element (18*c*), wherein a movement of the main valve body (20') in the first adjustment range in the opening direction takes place exclusively counter to a restoring force of the second restoring element (18*c*), and wherein a movement of the main valve body (20') in the second adjustment range in the opening direction takes place exclusively counter to a restoring force of the first restoring element (18*a*).

16. The filling nozzle as claimed in claim 10, wherein the preloading device (18) comprises:

a first restoring element (18*a*) with a first restoring constant which urges the main valve body (20") into the closed position relative to the main valve seat (23), and a second restoring element (18*d*) with a second restoring constant which urges the main valve body (20") in the opening direction relative to the main valve seat (23).

17. The filling nozzle as claimed in claim 16, wherein the restoring constant of the preloading device (18) in the first adjustment range results from a combination of restoring constants of the first and second restoring elements (18*a*, 18*d*) and wherein the restoring constant of the preloading device (18) in the second adjustment range results only from the restoring constant of the first restoring element (18*a*).

18. The filling nozzle as claimed in claim 16, wherein a restoring force of the first restoring element (18*a*), which acts in the first adjustment range on the main valve body (20"), is greater than a restoring force of the second restoring element (18*d*) which acts in the first adjustment range on the main valve body (20").

19. The filling nozzle as claimed in one of claim 16, wherein the second restoring element (18*d*) has a first end and an opposing second end in a deflection direction, wherein the first end is fixed to the main valve body (20") and wherein during a movement of the main valve body (20") in the first adjustment range the second end bears against a stop (25) which is fixed relative to the main valve seat (23), and wherein during a movement of the main valve body (20") in the second adjustment range the second end is released from the stop (25), wherein a deflection of the second end of the second restoring element (18*d*) in the upstream direction is preferably delimited by a limit projection (38) which is fixed to the main valve body (20").

20. A filling pump with a feed pump for delivering a fluid and with a filling hose which connects the feed pump to a filling nozzle as claimed in claim 1.

* * * * *